United States Patent [19]

Yamasaki et al.

[11] Patent Number: 5,254,325
[45] Date of Patent: Oct. 19, 1993

[54] PROCESS AND APPARATUS FOR PREPARING CARBON BLACK

[75] Inventors: Hiroshi Yamasaki; Yasuhiro Sagara; Kazuaki Shinohara; Hiroshi Nakagaki; Masaki Kurihara; Takaaki Kanai, all of Fukuoka, Japan

[73] Assignee: Nippon Steel Chemical Co., Ltd., Tokyo, Japan

[21] Appl. No.: 870,744

[22] Filed: Apr. 20, 1992

Related U.S. Application Data

[63] Continuation-in-part of Ser. No. 601,719, Dec. 19, 1990, filed as PCT/JP90/00249, Feb. 28, 1990, abandoned.

[30] Foreign Application Priority Data

Dec. 28, 1989 [JP] Japan ................ 1-338087
Feb. 28, 1990 [JP] Japan ................ 1-45319

[51] Int. Cl.⁵ .............................................. C09C 1/50
[52] U.S. Cl. ............................................. 423/450
[58] Field of Search ................................... 423/450

[56] References Cited

U.S. PATENT DOCUMENTS

| Re. 28,994 | 9/1976 | Morgan et al. | 423/450 |
| 4,213,939 | 7/1980 | Ruble | 422/151 |
| 4,822,588 | 4/1989 | Gravley et al. | 423/450 |
| 4,988,493 | 1/1991 | Norman et al. | 423/450 |

FOREIGN PATENT DOCUMENTS

| 0209908 | 1/1987 | European Pat. Off. |
| 2349628 | 11/1977 | France |
| 61-34071 | 2/1986 | Japan |
| 62-277446 | 12/1987 | Japan |

OTHER PUBLICATIONS

Soviet Inventions Illustrated, Chemical, week 8712, Jan. 4, 1987; Derwent Publications, Ltd. London GB, Abstract No. 87-085139/12 & SU-A-1247381.

*Primary Examiner*—Michael Lewis
*Assistant Examiner*—Stuart L. Hendrickson
*Attorney, Agent, or Firm*—Nikaido, Marmelstein, Murray & Oram

[57] ABSTRACT

A process for preparing a carbon black which can control the particle size distribution and aggregate size distribution of the carbon black. This apparatus comprises a combustion chamber, a cylindrical throat more contracted than the combustion chamber, which is adapted for forming a plug flow of the hot gas, downstream of said throat, an expanding venturi portion downstream of said throat, and a carbon black reaction chamber; and a process comprising forming a plug flow of the hot gas in at least the cylindrical throat and the expanding venturi portion; and feeding a hydrocarbon material from hydrocarbon material spraying nozzles provided at two or more axially separate sites in the expanding venturi portion.

11 Claims, 5 Drawing Sheets

PROCESS AND APPARATUS FOR PREPARING CARBON BLACK

This is a continuation in part of application Ser. No. 601,719, filed Dec. 19, 1990, filed as PCT/JP90/00249, Feb. 28, 1990, now abandoned.

TECHNICAL FIELD

The present invention relates to a process and an apparatus for preparing a carbon black which enables the particle size distribution and aggregate size distribution of a carbon black to be controlled as desired.

BACKGROUND OF THE ART

Examples of known documents disclosing factors having an effect on the particle size distribution and specific process for controlling the particle size distribution include Japanese Patent Publication No. 13232/1979. In this publication, there is a description to the effect that introduction of a dehydrated waste gas in a reaction chamber makes the particle size small and, at the same time, makes the particle size distribution narrow.

Examples of known documents with respect to the control of the aggregate size distribution include Japanese Patent Application Laid Open Nos. 42773/1982 and 223865/1985 which disclose that the aggregate size distribution is controlled by axially spraying a raw material into a combustion gas filling chamber to mix it with a combustion gas and then changing the flow state of the mixture within a furnace through a throat portion and an expanding portion.

Japanese Patent Publication No. 1005/1972 is a known document on the injection of a thermally decomposable material hydrocarbon into a combustion gas at a high temperature wherein a material hydrocarbon is directly injected into a high-speed flow of a combustion gas. Specifically, in this apparatus, a material hydrocarbon is injected into a throat portion of a combustion chamber and the portion provided directly after the throat portion constitutes a reaction zone. The reaction zone is provided with a conical taper which is slightly divergent on the whole but provided with neither a cylindrical throat for a piston flow effect nor a venturi expanding portion.

In Japanese Patent Application Laid-Open No. 563/1972, a raw material is described to be injected into a point where a combustion gas stream has a sufficient mass velocity and in fact injected into a cylindrical throat (the smallest-diameter portion).

In Japanese Patent Application Laid-Open No. 183,364/1986, a material hydrocarbon oil is sprayed from a material hydrocarbon inlet tube passing through the side wall of the smallest-diameter portion of the venturi portion at an angle of $90\pm20°$ relative to the central axis.

In Japanese Patent Application Laid-Open No. 133,099/1977, a material hydrocarbon is introduced from one site relating to the central axis direction into the inlet portion of a cylindrical reaction chamber positioned downstream of a venturi expanding portion.

In U.S. Pat. No. 4,391,789, a material hydrocarbon is injected from a plurality of sites into a venturi reducing portion extending from a combustion chamber to a throat.

In U.S. Pat. No. 4,294,814, part of a material hydrocarbon oil is fed from the axial direction of a combustion chamber for the purpose of reducing the pressure loss of the reaction region, while when the fed material hydrocarbon oil passes together with a spirally flowing combustion gas through a venturi portion, the remaining material hydrocarbon oil is fed into the venturi expanding portion.

As described above, although provision of a material hydrocarbon inlet in a venturi reducing portion or a throat, is disclosed in known documents, no technical idea is found such that the particle size distribution or aggregate size distribution of a carbon black product is controlled as desired by providing a cylindrical throat having a piston flow effect, providing two or more material hydrocarbon spraying nozzles in the reactor axial direction from the throat to a venturi expanding portion and a reaction portion and spraying a material hydrocarbon oil through one or more selected material hydrocarbon spraying nozzles.

Japanese Patent Application Laid-Open No. 230677/1989 discloses a method wherein many and separately controlled carbon black material hydrocarbon oil streams are fed into respective reactor portions. Specifically, the oil streams are fed into an injection zone from a combustion chamber to a throat. In this portion, the combustion gas stream is not in a sufficiently piston-flowed state, so that the particle size distribution and the aggregate size distribution cannot be controlled as desired.

This invention is directed to the general art of preparing carbon black in an oil furnace process. In this generally known process, a suitable fuel, which is usually a hydrocarbonaceous gas or light liquid, is fed into a combustion chamber where it is substantially completely combusted with a suitable source of oxygen like air to form a hot combustion gas. This hot combustion gas, which contains substantially no material which is capable of further combustion, passes downstream into a reaction zone where the carbon black precursor is injected.

The carbon black precursor is suitably a hydrocarbon material, that is a petroleum oil. It is well known that this carbon black precursor hydrocarbon is usually a different hydrocarbon material than the fuel which is combusted to make the hot combustion gas. However, it is possible that the same hydrocarbonaceous materials could be used for both uses. The difference between these two materials, the fuel and the carbon black precursor, is that the fuel is substantially completely combusted to form the hot gas of gaseous combustion products, and the precursor is not combusted to any appreciable extent at all, but is only dehydrogenated to form substantially solid carbon black which is suspended in the hot combustion gas.

Thus, in this art, there is a recognized difference between the fuel which is used to form the hot combustion gas and the hydrocarbon material which is used to form the carbon black. The hydrocarbon material, which is used to form carbon black, is defined as having a CF value (defined as the cube root of the ratio of the boiling point of the hydrocarbon material in degrees Rankine to the specific gravity of the hydrocarbon material $CF = \sqrt[3]{T_B}/S$ of less than 10.1, and a Bureau of Mines Correlation Index (BMCI) value of more than 100.

The heat in the hot combustion gas causes the hydrocarbon material carbon black precursor to be partially dehydrogenated into solid particles of carbon black in the reaction zone, and these particles are then separated from the stack gas and harvested. The stack gas is suitably passed pit of a flue.

As the term is used herein, "hydrocarbon material" is intended to refer to that hydrocarbon material which is the carbon black precursor. By contrast the hydrocarbon material which is used in the process of this invention as the fuel, it referred to as "fuel". While both materials may be hydrocarbonaceous in nature, and may be the same or different chemically, they perform very different functions and should not be confused with each other.

This process is generally carried out in an apparatus which is generally circular in cross section, but whose cross section diameter is varied at different points in the streamwise direction. It is reasonable to say that whether all of the portions of this apparatus are linearly aligned, or whether some of these portions extend at angles to each other, the process has a generally streamwise centerline, and therefore one can characterize different locations in this apparatus as having a different distance from this streamwise centerline. Of course, the apparatus may have a cross section which is not circular, e.g. elliptical, but this same concept of a streamwise general centerline still applies.

An object of the present invention is to provide a process and an apparatus for preparing a carbon black which enables the particle size distribution and the aggregate size distribution to be controlled as desired.

DISCLOSURE OF INVENTION

The present inventors have made extensive and intensive studies with a view to elucidating factors having an effect on the particle size distribution and the aggregate size distribution.

As a result, the present inventors have found that the particle size distribution and the aggregate size distribution can be controlled as desired by forming a piston flow of a combustion gas stream at a throat portion and spraying a carbon black precursor hydrocarbon material from at least two axially and radially spaced locations downstream of the combustion chamber. That is they are located different distances from a streamwise centerline of the apparatus and different distances from the combustion chamber. In a preferred embodiment of this invention, a spraying nozzle is provided at one site or two or more separate sites of a venturi expanding portion along the axial direction of the reactor where the combustion gas stream is in a piston flow state, which has led to the completion of the present invention.

Further, the present invention has been completed also based on such finding that in the spraying of a carbon black precursor hydrocarbon material from a spraying nozzle provided at two or more separate sites of a venturi expanding portion and a side wall of the reaction chamber along the axial (streamwise) direction of the reactor where the combustion gas stream is in a piston flow state, the selection of the sites of the carbon black precursor hydrocarbon material spraying nozzles, particularly the internal volume of the reactor between respective carbon black precursor hydrocarbon material spraying nozzles causes the aggregate size distribution to be regularly changed and the adjustment of the proportions of the material hydrocarbon introduced through each material hydrocarbon spraying nozzle enables the particle size distribution and the aggregate size distribution to be controlled as desired. According to the present invention, there are provided processes and apparatuses for preparing a carbon black described in the following items (1) to (15).

(1) A process for preparing a carbon black comprising providing an apparatus having a substantially common streamwise centerline, comprised of a combustion chamber, a cylindrical throat more contracted than said combustion chamber and, successively provided from the throat, a venturi expanding portion and a carbon black reactor, said reactor having a reaction chamber more expanded than said throat; preparing a hot gas of a combustion gas necessary for a carbon black formation reaction in at least said combustion chamber; feeding a material hydrocarbon into said hot gas to prepare a carbon black in said reaction chamber; and quenching the carbon black, which comprises a combination of formation of a hot gas in a piston flow state in at least said venturi expanding portion by a structure comprising said combustion chamber, said cylindrical throat and said venturi expanding portion, with spraying of a material hydrocarbon into the hot gas from a material hydrocarbon spraying nozzle provided at two or more axially separate sites in said venturi expanding portion in a single use or a combined use thereof.

(2) A process for preparing a carbon black comprising providing an apparatus comprised of a combustion chamber, a cylindrical throat more contracted than said combustion chamber and, successively provided from the throat, a venturi expanding portion and a carbon black reactor, said reactor having a reaction chamber more expanded than said throat; preparing a hot gas of a combustion gas necessary for a carbon black formation reaction in at least said combustion chamber; feeding a material hydrocarbon into said hot gas to prepare a carbon black in said reaction chamber; and quenching the carbon black, which comprises a combination of formation of a hot gas in a piston flow state in at least said cylindrical throat and venturi expanding portion by a structure comprising said combustion chamber, said cylindrical throat and said venturi expanding portion, with spraying of a material hydrocarbon into the hot gas from at least two material hydrocarbon spraying nozzles in combination selected from material hydrocarbon spraying nozzles provided at two or more axially separate sites from the cylindrical throat to the venturi expanding portion and the reaction chamber.

(3) A process for preparing a carbon black according to the above-described item (2), which comprises a combination of spraying of a material hydrocarbon into the hot gas through a combined use of two or more material hydrocarbon spraying nozzles selected from material hydrocarbon spraying nozzles provided at two or more axially separate sites from the cylindrical throat to the venturi expanding portion and the reaction chamber, with the adjustment of the proportion of the material hydrocarbon introduced through the material hydrocarbon spraying nozzles used in combination.

(4) A process for preparing a carbon black according to the above described item (2) or (3), wherein the material hydrocarbon is sprayed into the hot gas from a first-stage material hydrocarbon spraying nozzle provided at the cylindrical throat or the venturi expanding portion and a second stage material hydrocarbon spraying nozzle provided at the venturi expanding portion or the reaction chamber provided downstream of the first-stage material hydrocarbon spraying nozzle.

(5) An apparatus for preparing a carbon black comprising a combination of a combustion chamber for generating a hot gas necessary for a carbon black formation reaction with a cylindrical throat more contracted than the combustion chamber, connected to said combustion chamber and capable of imparting a piston flow effect to the hot gas and, provided after said throat, a venturi expanding portion communicating with a reaction chamber, a carbon black formation reaction chamber communicating with said venturi expanding portion, a quenching chamber and a flue connected to the end of the reaction chamber, and two or more material hydrocarbon spraying nozzles axially provided in said venturi expanding portion.

(6) An apparatus for preparing a carbon black comprising a combination of a combustion chamber for generating a hot gas necessary for a carbon black formation reaction with a cylindrical throat more contracted than the combustion chamber, connected to said combustion chamber and capable of imparting a piston flow effect to the hot gas and, provided after said throat, a venturi expanding portion communicating with a more expanded reaction chamber than the throat, a carbon black formation reaction chamber communicating with said venturi expanding portion, a quenching chamber and a flue connected to the end of the reaction chamber, and two or more material hydrocarbon spraying nozzles axially provided from said cylindrical throat to said venturi expanding portion and said reaction chamber.

(7) An apparatus for preparing a carbon black according to the above-described item (6), wherein two or more material hydrocarbon spraying nozzles are axially provided from the cylindrical throat to the venturi expanding portion.

(8) An apparatus for preparing a carbon black according to the above-described item (6), wherein two or more material hydrocarbon spraying nozzles are axially provided from the venturi expanding portion to the reaction chamber.

(9) An apparatus for preparing a carbon black according to any one of the above-described items (5) to (8), wherein the end of a preliminary combustion chamber provided with an external burner or the like is coaxially connected to the center of the upstream end wall of the combustion chamber.

(10) An apparatus for preparing a carbon black according to any one of the above-described items (5) to (9), wherein the ratio of the length, L, to the diameter, D, of the cylindrical throat, i.e., L/D, is 1 or more.

(11) An apparatus for preparing a carbon black according to any one of the above described items (5) to (9), wherein the ratio of the length, L, to the diameter, D, of the cylindrical throat, i.e., L/D, is 1 to 5.

(12) An apparatus for preparing a carbon black according to any one of the above-described items (5) to (11), wherein the total angle of the venturi expanding portion is 5° to 12°.

(13) An apparatus for preparing a carbon black according to any one of the above-described items (5) to (12), wherein the total angle of a venturi reducing portion extending from the combustion chamber to the cylindrical throat is 100° or less.

(14) An apparatus for preparing a carbon black according to any one of the above-described items (5) to (13), wherein the ratio of the diameter, D, of the cylindrical throat to the diameter, $D_1$, of the combustion chamber, i.e., $D/D_1$, is 0.2 to 0.5.

The present invention will now be described in more detail. While there is no limitation on the material hydrocarbon usable in the present invention, the carbon black precursor hydrocarbon material should be one which conforms to the conventional material which is normally used to make carbon black, that is one having a CF value of less than about 10.1 and having a BMCI value of at least about 100 and Examples thereof include coal tar originated heavy oils such as anthracene oil and creosote oil, petroleum gas oils or distillates, and residues produced as by products in the thermal cracking of petroleum. Coal gases, petroleum gases, light oils, heavy oils, etc. may be used as the fuel.

The apparatus of the present invention is generally of a horizontal type. Alternatively, it may be of a vertical type. The cross-section of the combustion chamber and the reaction chamber is generally cylindrical. However, it is not limited to this only.

In the present invention, "at least" in the expression "preparing a hot gas of a combustion gas necessary for a carbon black formation reaction in at least said combustion chamber" is intended to mean that in the combustion chamber, a fuel hydrocarbon and air may be fed followed by combustion to prepare a combustion gas; a fuel is subjected to pre-combustion by means of a primary air, while only a second air is fed into the combustion chamber for complete combustion; or complete combustion is conducted by means of an external burner, while only filling of a combustion gas is conducted in the combustion chamber.

However, in order to maintain a piston flow as much as possible in the venturi expanding portion of the present invention, it is preferred to adopt a system wherein the head of a preliminary combustion chamber provided with an external burner is coaxially connected to the center of an upstream end wall of the combustion chamber to parallelly flow a pre-combustion gas toward the throat so as not to cause a spiral flow as much as possible and, in the combustion chamber, a secondary air is properly fed from a peripheral wall for complete combustion.

A particularly preferred system is such that in the combustion chamber a second air is introduced in the tangential direction opposite to a spiral flow of the pre-combustion gas coming from the preliminary combustion chamber, thereby conducting complete combustion while weakening the spiral flow of the pre-combustion gas by the stream of the secondary air.

The "air" used in the present invention include oxygen-containing gases such as the air, oxygen enriched air, and further mixed gases prepared by mixing inert gases, such as nitrogen and argon, with oxygen in proper proportions.

In the above-described contracted cylindrical throat connected to the combustion chamber, a parallel section having a given length is provided for the purpose of maintaining the hot gas in a piston flow state. Further, it is also necessary for the piston flow of the hot gas to be maintained also in the venturi expanding portion extending from the throat to the reaction chamber.

The present inventors have made experiments with various variations in combination of the length of the parallel section of the throat with the angle of the succeeding venturi expanding portion and, as a result, have found that there exist certain conditions for controlling the particle size distribution and the aggregate size distribution of a carbon black as desired through maintenance of the piston flow of the hot gas. Specifically, a particularly excellent effect can be attained when the ratio of the length, L, to the diameter, D, of the cylindrical throat, i.e., L/D, and the total angle of the venturi expanding portion are 1 or more, preferably 1 to 5, and 5 to 12°, preferably 6 to 10°, respectively.

There is no particular limitation on the angle of the inlet side of the throat as long as the L/D and the angle of the venturi expanding portion fall within the above-described range. However, when the piston flow effect in the succeeding section is taken into consideration, the total angle of the venturi reducing portion is 100° or less, preferably 50° to 90°. With respect to spraying nozzles provided at two or more axially separate sites of the venturi expanding portion and spraying nozzles provided at two or more axially separate sites from the cylindrical throat to the venturi expanding portion and the reaction chamber, it is preferred to provide one spraying nozzle substantially vertical to the wall surface of each section or to provide a plurality of nozzles on the peripheral wall.

In the first invention, the above-described spraying nozzles provided at separate sites of the venturi expanding portion are used individually or in combination for ejection of the material hydrocarbon therefrom. The material hydrocarbon is sprayed from one or more spraying nozzles selected according to the intended particle size distribution and the aggregate size distribution.

What is important to the first invention is to provide a plurality of material hydrocarbon spraying nozzles at the venturi expanding portion and to use them individually or in combination.

The term "venturi expanding portion" is intended to mean a section extending from the rear end of the throat to the succeeding cylindrical reaction chamber.

In the second invention, the above described spraying nozzles provided at two or more axially separate sites of the cylindrical throat, the venturi expanding portion and the reaction chamber are used in combination of at least two axially separated nozzles for ejection of the material hydrocarbon therefrom. The material hydrocarbon is sprayed from at least two nozzles selected from two or more spraying nozzles according to the desired particle size distribution and aggregate size distribution.

What is important to the second invention is to provide a plurality of material hydrocarbon spraying nozzles at two or more axially separate sites of the cylindrical throat, the venturi expanding portion and the reaction chamber and to select two or more of them for use in combination. It is preferred that the material hydrocarbon spraying nozzle in the cylindrical throat is disposed at the rear end portion where the piston flow has been formed.

Spraying of the material hydrocarbon from two selected spraying nozzles, i.e., one praying nozzle provided at the rear end portion of the cylindrical throat and one spraying nozzle provided at the venturi expanding portion or the reaction chamber, is most preferred from the viewpoint of easy control of the particle size distribution and the aggregate size distribution.

In the present invention, the ratio of the length, L, to the diameter, D, of the cylindrical throat, i.e., L/D, is preferably 1 to 5 from the viewpoint of formation of the piston flow of the combustion gas. When the ratio exceeds 5, the pressure loss due to the hot gas unfavorably becomes large. On the other hand, when the ratio is less than 1, the piston flow effect unfavorably becomes insufficient.

The ratio of the diameter, D, of the throat to the diameter, $D_1$, of the combustion chamber, i.e., $D/D_1$, is preferably about 0.2 to 0.5.

The angle of the venturi expanding portion is 5° to 12°, preferably 6° to 10° in terms of the total angle from the viewpoint of attaining the most excellent effect.

The reaction chamber is a cylindrical section following the venturi expanding portion. In general, the diameter of the reaction chamber is equal to or smaller than that of the combustion chamber. The residence time of the gas can be prolonged by making the diameter of part of the reaction chamber larger than that of the other part.

The rear portion of the reaction chamber is usually provided with a multistage water spraying nozzle in the axial direction thereof to form a cooling chamber. An expanded flue is provided after the cooling chamber. They are coaxially provided.

In the first invention, material hydrocarbon spraying nozzles for introducing a liquid hydrocarbon are axially provided in a multistage manner at the venturi expanding portion.

One material hydrocarbon spraying nozzle may be provided in each stage. However, in order to uniformly disperse the material hydrocarbon in the hot gas, it is preferred to provide a plurality of spraying nozzles in each stage on the circumferential direction thereof.

Figure 1:
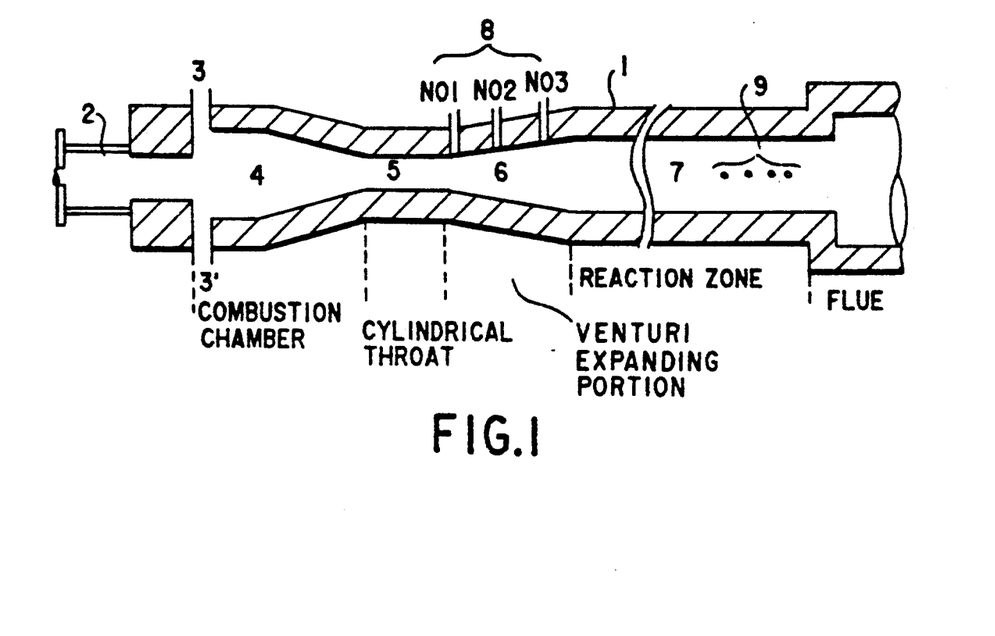
FIG. 1 is a vertical elevational view of a reactor of a carbon black production apparatus utilized in the first invention.

FIG. 1 is a schematic vertical cross-sectional view of a carbon black production apparatus utilized in the first invention. In FIG. 1, numeral 1 designates a carbon black reactor, numeral 2 an inlet of a pre-combustion gas from a preliminary combustion chamber, numeral 3 a secondary air inlet, numeral 4 a combustion chamber having a convergent taper portion, numeral 5 a throat, numeral 6 venturi expanding portion, numeral 7 a reaction chamber, numeral 8 material hydrocarbon inlets, and numeral 9 cooling water spraying nozzles.

In connection with working examples which will be described later, the spraying nozzles will be referred to as "spraying nozzle Nos. 1 to 3" from the front portion to the rear portion. This figure is drawn in such a manner that the material hydrocarbon is sprayed from the top of the apparatus. However, a plurality of spraying nozzles are provided in the concyclic direction of each site.

The combustion chamber shown in the figure is an example thereof having such a structure that an inlet of a pre-combustion gas from a preliminary combustion chamber is provided at the central portion of the upstream end wall and a secondary air is introduced from circumferential wall portions 3, 3'.

A plurality of cooling water spraying nozzles 9 are axially provided at the rear portion of the reaction chamber.

In the second invention, material hydrocarbon spraying nozzles for introducing a liquid hydrocarbon are axially provided in a multistage from the cylindrical throat to the venturi expanding portion.

In each stage, one material hydrocarbon spraying nozzle may be provided. However, in order to uniformly disperse the material hydrocarbon in the hot gas, it is preferred to provide a plurality of spraying nozzles in each stage on the circumferential direction thereof.

The material hydrocarbon is injected into the hot gas through a combined use of two or more spraying nozzles. At least two spraying nozzles are selected according to the desired particle size distribution and aggregate size distribution, and the material hydrocarbon is introduced while adjusting the proportion of the material hydrocarbon introduced through each material hydrocarbon spraying nozzle. At that time, it is preferred to select as a first stage material hydrocarbon spraying nozzle a material hydrocarbon spraying nozzle provided at the cylindrical throat or venturi expanding portion and as a second-stage material hydrocarbon spraying nozzle a material hydrocarbon spraying nozzle provided downstream of the the first-stage spraying nozzle.

In this case, the aggregate size distribution of the resultant carbon black varies depending upon the site of the selected spraying nozzles, particularly the internal volume of the reactor between respective material hydrocarbon spraying nozzles, i.e., the residence times of the gas between respective material hydrocarbon spraying nozzles. Specifically, there is a tendency that the aggregate size distribution of the formed carbon black broadens with an increase in the internal volume. In particular, when the material hydrocarbon spraying nozzle provided on the side wall of the reaction chamber is used as the downstream material hydrocarbon spraying nozzle, it is possible to prepare a carbon black having a broad aggregate size distribution.

Further, the particle size distribution can be controlled through adjustment of the proportion of the material hydrocarbon introduced through each material hydrocarbon spaying nozzle. In general, when the amount of the material hydrocarbon introduced through the upstream material hydrocarbon spraying nozzle is larger than that of the material hydrocarbon introduced through the downstream material hydrocarbon spraying nozzle, the particle size distribution tends to become narrow. In the opposite case, the particle diameter distribution tends to become broad. In some cases, the particle size distribution becomes narrower than that in the case of single introduction from the upstream material hydrocarbon spraying nozzle and, in some cases, becomes broader than that in the case of single introduction from the downstream material hydrocarbon spraying nozzle depending upon the proportion of the material hydrocarbon introduced from the upstream material hydrocarbon spraying nozzle and the downstream material hydrocarbon spraying nozzle, so that adjustment of the proportion of the material hydrocarbon introduced through each material hydrocarbon spraying nozzle enables the particle size distribution to be controlled in a wider range than that in the case where the material hydrocarbon is introduced from a nozzle in one site only.

Figure 6:
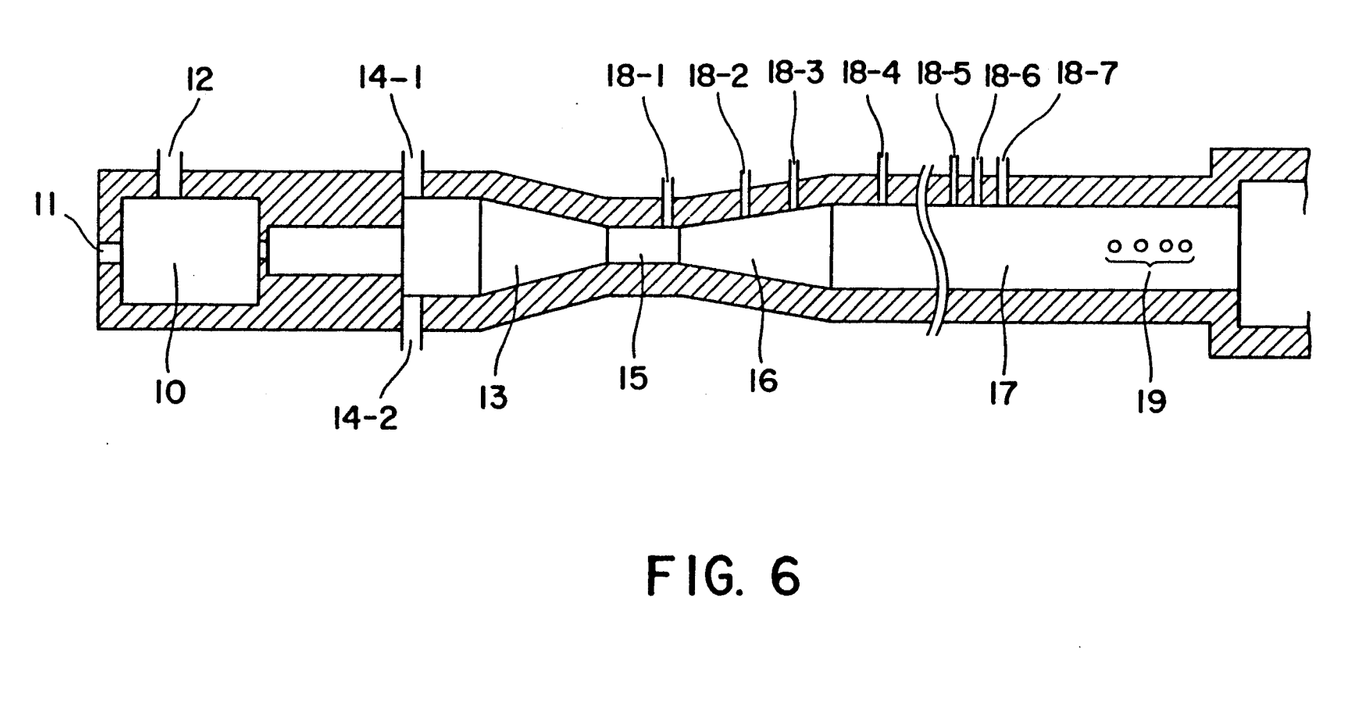
FIG. 6 is a vertical elevational view of a reactor of a carbon black production apparatus utilized in the second invention.

FIG. 6 is a schematic vertical cross sectional view of a reactor of a carbon black production apparatus utilized in the second invention. In FIG. 6, numeral 10 designates a preliminary combustion chamber, numeral 11 a fuel spraying nozzle, numeral 12 a primary air inlet, numeral 13 a combustion chamber having a convergent taper portion, numerals 14-1 and 14-2 each a secondary air inlet, numeral 15 a cylindrical throat, numeral 16 a venturi expanding portion, numeral 17 a reaction chamber, numerals 18-1, 18-2, 18-3, 18-4, 18-5, 18-6 and 18-7 each a material hydrocarbon inlet and numeral 19 cooling water spraying nozzles.

FIG. 6 is drawn in such a manner that the material hydrocarbon is sprayed from the top of the reactor. However, a plurality of spraying nozzles are provided in the concyclic direction of each site.

The combustion chamber is an example having such a structure that an inlet of a pre-combustion gas from a preliminary combustion chamber is provided at the central portion of the upstream end wall and a secondary air is introduced from the secondary air inlets 14-1 and 14-2 provided in the circumferential wall portion. The secondary air inlets 14-1 and 14-2 are provided in the tangential direction opposite to the primary air inlet of the preliminary combustion chamber.

A plurality of cooling water spraying nozzles 19 are axially provided at the rear portion of the reaction chamber.

BEST MODE FOR CARRYING OUT THE INVENTION

The present invention will now be described in more detail by way of the following Examples which should not be construed as limiting the scope of the present invention.

Analytical values of a material hydrocarbon oil used in the following Examples, the method for measuring the particle size distribution of carbon black (CB), the analytical method for aggregate size of carbon black according to the photosedimentometry, and the definition of $D_{st}$ and $\Delta D_{50}$ are as follows.

(1) Material Hydrocarbon Oil

A coal tar-originated heavy oil was used as the material hydrocarbon oil, and properties and composition thereof are shown in the following table. In the table, "%" is "% by weight".

| | |
|---|---|
| Specific gravity (15/4° C.) | 1.162 |
| Specific viscosity (70/20° C.) | 1.49 |
| Coke residue (%) | 0.39 |
| Carbon content (%) | 91.8 |
| Hydrogen content (%) | 5.8 |
| Sulfur content (%) | 0.4 |

| -continued | |
|---|---|
| BMCI* | 169 |

Note:
*BMCI: Bureau of Mines Correlation Index (2) Method for Measuring Particle Size Distribution of Carbon Black An electron photomicrograph of carbon black was taken and then applied to a particle size distribution measuring apparatus TGA10 manufactured by Zeiss (West Germany) to determine the number average particle size, $\bar{x}$ [nm], and the standard deviation $\sigma$[nm], of the size distribution.

(3) Method for Measuring Carbon Black Aggregate Size

The photosedimentometry was used for this purpose. The instrument used was Disk Centrifuge (DCF) (manufactured by Joyce Loebl, England), and the measuring method was as follows.

A dried carbon black sample is mixed with an aqueous ethanol solution and sufficiently dispersed by means of an ultrasonic wave to prepare a dispersion.

A spin fluid (a glycerin solution having a suitable concentration) is injected into a disk being rotated at a preset number of revolutions, a small amount of a buffer (a solution having a smaller specific gravity than that of the spin fluid) is injected according to the buffered line start technique, the buffer is diffused by making use of a "cut" and "boost" control, and 0.2 ml of the above-described dispersion is then injected into the disk at the time when the revolutions are stabilized.

The relationship between the time taken for passing through a fixed point (photo diode) and the concentration is determined through the use of a calculation formula according to the Stokes' equation, thereby obtaining a histogram of the mode Stokes diameter of the carbon black aggregate and the frequency.

In the above-described histogram, the maximum frequency mode Stokes diameter is designated "$D_{st}$" for use as a measure of the average size of the carbon black aggregate.

The half band width of the $D_{st}$ is defined as $\Delta D_{50}$ and represents the distribution width of the aggregate size.

EXAMPLE 1

Use was made of a testing apparatus (shown in FIG. 1) having a combustion chamber diameter of 390 mm$\phi$, a throat diameter, D, of 130 mm$\phi$, a convergent taper angle at the throat inlet (total angle) of 78°, a throat length, L, of 260 mm, a taper angle at the venturi expanding portion (total angle) of 6°, a venturi expanding portion length of 381 mm and a reaction chamber diameter of 170 mm$\phi$, and a material hydrocarbon described in the above item (1).

In the axial direction of the venturi expanding portion, the material hydrocarbon introduction site was varied to determine the relationship between the material hydrocarbon introduction site and the average particle size, $\bar{x}$ [nm], of carbon black and the standard deviation, $\sigma$ [nm], of the particle size distribution.

The material hydrocarbon introduction site No. 1 was provided at a distance of 21 mm from the inlet of the venturi expanding portion, the material hydrocarbon introduction site No. 2 was provided at a distance of 180 and the material hydrocarbon introduction site No. 3 was provided at a distance of 180 mm from the material hydrocarbon introduction site No. 2.

Figure 2:
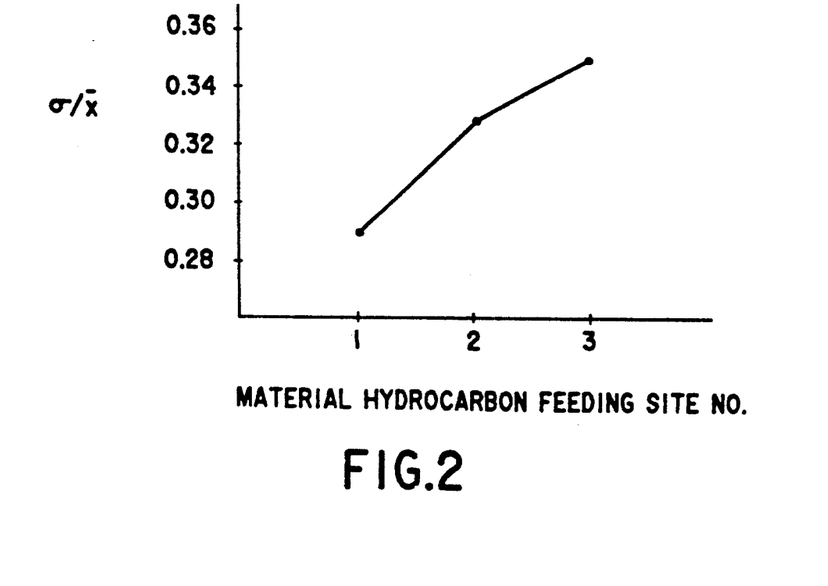
FIG. 2 is a graph showing the relationship between the material hydrocarbon spraying site of a venturi expanding portion and the particle size distribution of carbon black.

The experimental conditions and the results are shown in Table 1, and the relationship between the particle size distribution, $\sigma/\bar{x}$, and the spraying nozzle site is shown in FIG. 2. As is apparent from the results, shifting of the material hydrocarbon introduction site to the downstream side of the venturi expanding portion made the average particle size of carbon black larger and the particle size distribution broader.

TABLE 1

| | Experiment No. | | |
|---|---|---|---|
| | 1 | 2 | 3 |
| Material hydrocarbon feed site (FIG. 1) | No. 1 | No. 2 | No. 3 |
| Material hydrocarbon feed rate (l/hr) | 185 | 280 | 350 |
| Fuel feed rate (l/hr) | 53 | 53 | 53 |
| Total air feed rate (Nm³/hr) | 1,000 | 1,000 | 1,000 |
| Average particle size $\bar{x}$ (nm) | 20.49 | 28.35 | 30.19 |
| Standard deviation of particle size distribution $\sigma$ (nm) | 6.00 | 9.30 | 10.12 |

EXAMPLE 2

The same apparatus (FIG. 1) as that of Example 1 was used to examine the influence of a single stage spray and a two stage spray on the aggregate size distribution of carbon black.

Figure 3:
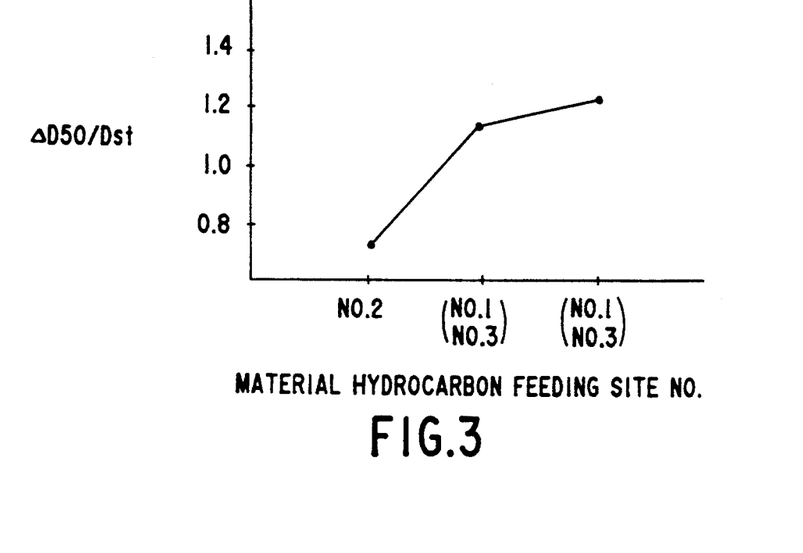
FIG. 3 is a graph showing the relationship between the material hydrocarbon spraying site of an venturi expanding portion (particularly in the case of a combined use of nozzles) and the aggregate size distribution of carbon black.

The experimental conditions and the results are shown in Table 2. In the mode Stokes diameter histogram of the aggregate, the maximum frequency mode Stokes diameter is represented by $D_{st}$ (nm), and the half band width of the $D_{st}$ is represented by $\Delta D_{50}$ (nm). The relationship between the aggregate size distribution, $\Delta D_{50}/D_{st}$, and the spraying nozzle site is shown in FIG. 3.

As is apparent from the results, the two stage spraying can make the aggregate size distribution broader than that of the single stage spraying.

TABLE 2

| | Experiment No. | | | | |
|---|---|---|---|---|---|
| | 2 | 4 | | 5 | |
| Material hydrocarbon feed site | No. 2 | No. 1 + No. 3 | | No. 1 + No. 3 | |
| Material hydrocarbon feed rate (l/hr) | 280 | 85 | 195 | 55 | 225 |
| Fuel feed rate (l/hr) | 53 | 53 | | 53 | |
| Total air feed rate (Nm³/hr) | 1,000 | 1,000 | | 1,000 | |
| Aggregate size $D_{st}$ (nm) | 133 | 133 | | 122 | |
| Half band width of aggregate size distribution $\Delta D_{50}$ (nm) | 98 | 150 | | 148 | |

EXAMPLE 3

The piston flow effect of a combustion gas at the venturi expanding portion was examined.

Figure 4:
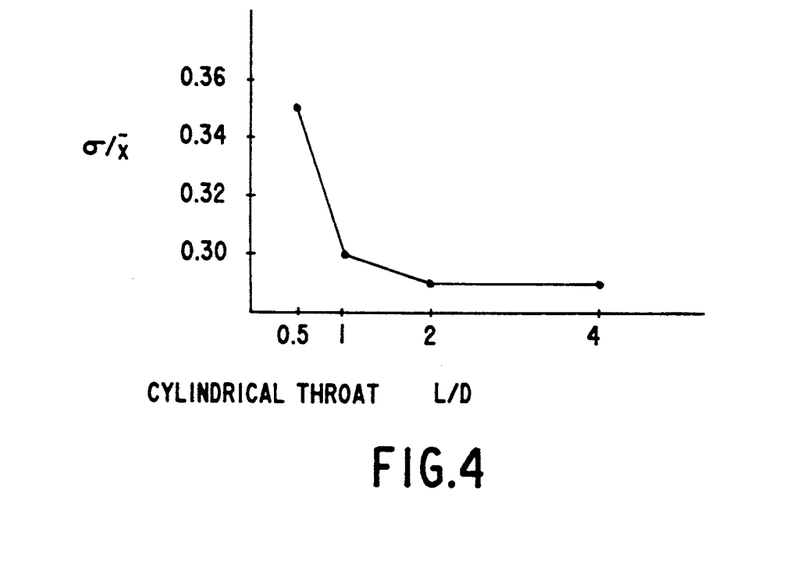
FIG. 4 is a graph showing the relationship between the L/D value of a throat and the particle size distribution of carbon black.

In the apparatus used in Example 1, with respect to the axial length, L, and the diameter, D, of the throat, in order to examine the influence of the L/D value, experiments were conducted through the use of four throats having different L/D values with a constant angle of the venturi expanding portion. The experimental conditions and the results, i.e., $\bar{x}$ (nm) and $\sigma$ (nm), are shown in Table 3. The relationship between the particle size distribution, $\sigma/\bar{x}$, and the L/D at the throat is shown in FIG. 4.

When the L/D value is 0.5, the particle size distribution could not be made sharp.

TABLE 3

|  | Experiment No. | | | |
| --- | --- | --- | --- | --- |
|  | 6 | 7 | 8 | 9 |
| Material hydrocarbon feed site | No. 1 | No. 1 | No. 1 | No. 1 |
| Material hydrocarbon feed rate (l/hr) | 185 | 185 | 185 | 185 |
| Fuel feed rate (l/hr) | 53 | 53 | 53 | 53 |
| Total air feed rate (Nm³/hr) | 1,000 | 1,000 | 1,000 | 1,000 |
| Angle of venturi expanding portion (°) | 6 | 6 | 6 | 6 |
| Throat L/D (—) | 0.5 | 1 | 2 | 4 |
| Average particle size $\bar{x}$ (nm) | 20.91 | 20.40 | 20.49 | 20.35 |
| Standard deviation of particle size distribution $\sigma$ (nm) | 7.37 | 6.10 | 6.00 | 5.98 |

EXAMPLE 4

The piston flow effect of a combustion gas at the venturi expanding portion was examined in the same manner as that of Example 3.

Figure 5:
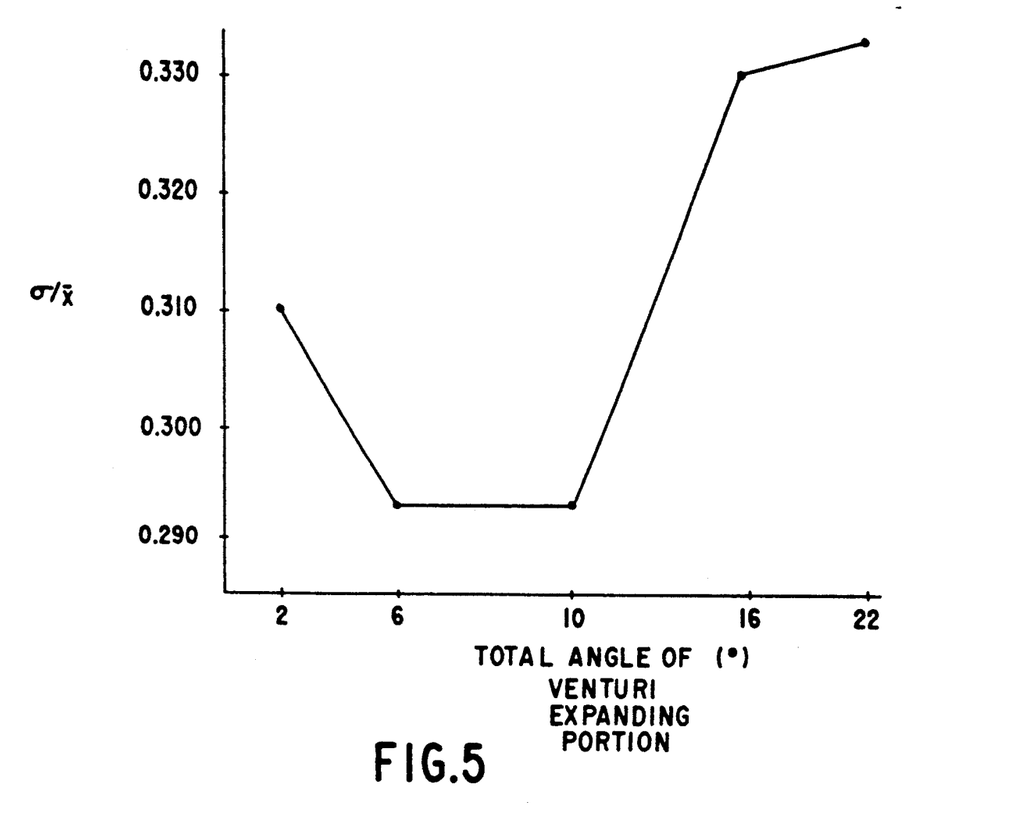
FIG. 5 is a graph showing the relationship between the angle of a venturi expanding portion and the particle size distribution of carbon black.

In the apparatus used in Example 1, the influence of the total angle (conical angle) of the venturi expanding portion was examined by replacing only the venturi expanding portion while keeping a constant L/D value. The experimental conditions and the results are shown in Table 4. The relationship between the particle size distribution, $\sigma/\bar{x}$, of the carbon black product and the angle is shown in FIG. 5. As is apparent from the results, no sharp particle size distribution is obtained when the total angle (conical angle) of the venturi expanding portion is smaller and larger than 6° to 10°.

A material hydrocarbon spraying nozzle 18-1 provided in the downstream side wall of the cylindrical throat 15 was used in combination with a material hydrocarbon spraying nozzle 18-4 provided in the upstream side wall of the reaction chamber, and the proportion of the material hydrocarbon introduced through each material hydrocarbon spraying nozzle was varied to determine the relationship between the proportion of introduction of the material hydrocarbon and the particle size distribution. The material hydrocarbon spraying nozzle 18-1 was provided at a distance of 191 mm from the inlet of the cylindrical throat, the material hydrocarbon spraying nozzle 18-2 was provided at a distance of 191 mm from the inlet of the venturi expanding portion, the material hydrocarbon spraying nozzle 18-3 was provided at a distance of 200 mm from the material hydrocarbon spraying nozzle 18-2, and the material hydrocarbon spraying nozzle 18-4 was provided at a distance of 397 mm from the inlet of the reaction chamber.

Figure 7:
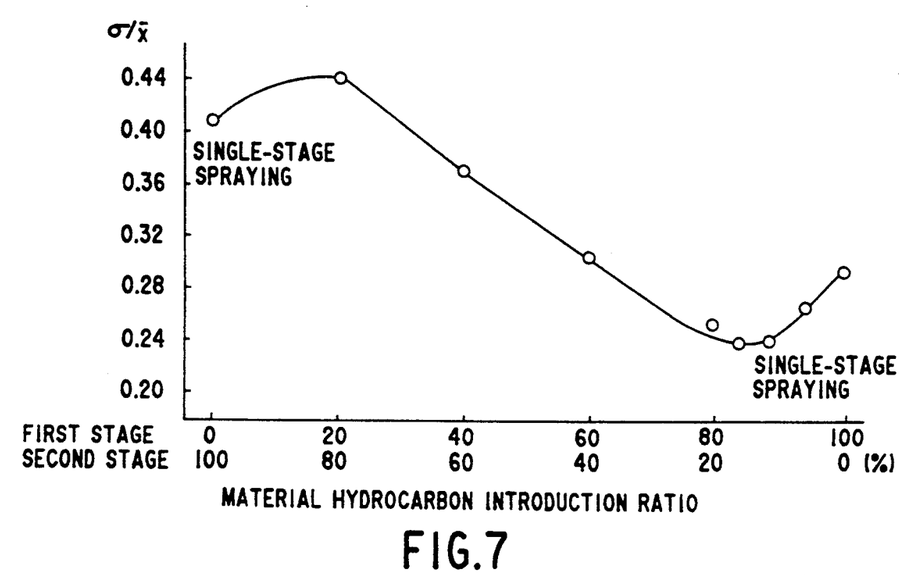
FIG. 7 is a graph showing the relationship between the proportions of introduction of a material hydrocarbon in the first-stage material hydrocarbon spraying nozzle and the second-stage material hydrocarbon spraying nozzle.

The experimental conditions and the results are shown in Table 5, and the relationship between the ratio

TABLE 4

|  | Experiment No. | | | | |
| --- | --- | --- | --- | --- | --- |
|  | 10 | 11 | 12 | 13 | 14 |
| Material hydrocarbon feed site | No. 1 | No. 1 | No. 1 | No. 1 | No. 1 |
| Material hydrocarbon feed rate (l/hr) | 185 | 185 | 185 | 185 | 185 |
| Fuel feed rate (l/hr) | 53 | 53 | 53 | 53 | 53 |
| Total air feed rate (Nm³/hr) | 1,000 | 1,000 | 1,000 | 1,000 | 1,000 |
| Throat L/D (—) | 2 | 2 | 2 | 2 | 2 |
| Angle of venturi expanding portion (°) | 2 | 6 | 10 | 16 | 22 |
| Average particle size $\bar{x}$ (nm) | 20.63 | 20.49 | 20.52 | 20.87 | 20.96 |
| Standard deviation of particle size distribution $\sigma$ (nm) | 6.40 | 6.00 | 6.01 | 6.88 | 6.97 |

EXAMPLE 5

Use was made of a testing apparatus (shown in FIG. 6) having a combustion chamber diameter of 390 mm$\phi$, a throat diameter, D, of 130 mm$\phi$, a convergent taper angle at the throat inlet (total angle) of 78°, a throat length, L, of 260 mm, a taper angle at the venturi expanding portion (total angle) of 6°, a venturi expanding portion length of 381 mm and a reaction chamber diameter of 170 mm$\phi$, and a material hydrocarbon described in the above item (1).

of the amount of the material hydrocarbon introduced through the material hydrocarbon spraying nozzle 18-1 (amount of introduction in the first stage) to the amount of the material hydrocarbon introduced through the material hydrocarbon spraying nozzle 18-4 (amount of introduction in the second stage) and the particle size distribution ($\sigma/\bar{x}$) is shown in FIG. 7. As is apparent from the results, the particle size distribution became broadest when the amount of introduction in the first stage and that in the second state were 20% and 80%, respectively. By contrast, the particle size distribution became narrowest when the amount of introduction in the first stage and that in the second stage were 84% and 16%, respectively.

Figure 8:
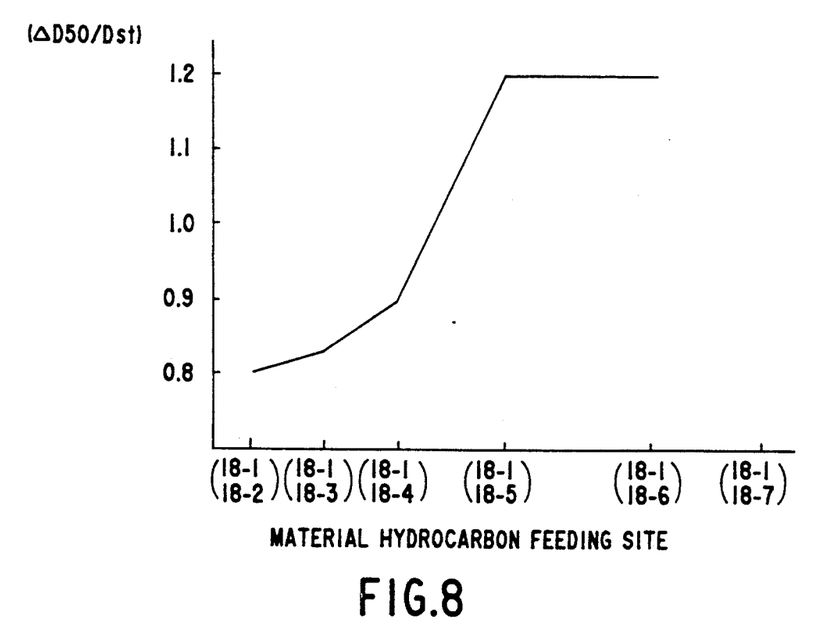
FIG. 8 is a graph showing the relationship between the material hydrocarbon spraying site and the aggregate size distribution of carbon black.

As is apparent from the results, the aggregate size distribution can be made broader by shifting the second-stage spraying nozzle to the more downstream side, i.e.,

TABLE 5

| | Experiment No. | | | | | | | | |
|---|---|---|---|---|---|---|---|---|---|
| | 15 | 16 | 17 | 18 | 19 | 20 | 21 | 22 | 23 |
| Material hydrocarbon feed site (FIG. 6) | 18-1 | 18-1, 18-4 | 18-1, 18-4 | 18-1, 18-4 | 18-1, 18-4 | 18-1, 18-4 | 18-1, 18-4 | 18-1, 18-4 | 18-4 |
| Material hydrocarbon feed rate (l/hr) | 280 | 56–224 | 112–168 | 168–112 | 224–56 | 234–46 | 249–31 | 263–17 | 280 |
| Fuel feed rate (l/hr) | 53 | 53 | 53 | 53 | 53 | 53 | 53 | 53 | 53 |
| Total air feed rate (Nm$^3$/hr) | 1,000 | 1,000 | 1,000 | 1,000 | 1,000 | 1,000 | 1,000 | 1,000 | 1,000 |
| Average particle size x (nm) | 28.9 | 26.8 | 23.6 | 26.0 | 29.0 | 31.0 | 32.0 | 30.0 | 28.0 |
| Standard deviation of particle size distribution $\sigma$ (nm) | 11.8 | 11.8 | 8.7 | 7.8 | 7.3 | 7.4 | 7.7 | 8.1 | 8.1 |
| Particle size distribution $\sigma/\bar{x}$ | 0.41 | 0.44 | 0.37 | 0.30 | 0.25 | 0.24 | 0.24 | 0.27 | 0.29 |

EXAMPLE 6

The same apparatus (shown in FIG. 6) as that of Example 5 was used to examine the influence of the internal volume of the reactor on the aggregate size distribution of carbon black between the first-stage spraying nozzle and the second-stage spraying nozzle when the material hydrocarbon spraying nozzle 18-1 provided on the downstream side wall of the cylindrical throat 15 (first stage spraying nozzle) was used in combination with the material hydrocarbon spraying nozzle 18-2 provided on the central side wall of the venturi expanding portion 16, the material hydrocarbon spraying nozzle 18-3 provided on the downstream side wall of the venturi expanding portion 16, or the material hydrocarbon spraying nozzle 18-4 or 18-5 or 18-6 provided in a divided form in the upstream side wall of the reaction chamber (second stage spraying nozzle). The material hydrocarbon spraying nozzle 18-5 was provided at a distance of 488 mm from the material hydrocarbon spraying nozzle 18-4, the material hydrocarbon spraying nozzle 18-6 was provided at a distance of 740 mm from the material hydrocarbon spraying nozzle 18-5, and the material hydrocarbon spraying nozzle 18-7 was provided at a distance of 370 mm from the hydrocarbon spraying nozzle 18-6.

The experimental conditions and the results are shown in Table 6. In the mode Stokes diameter histogram of the aggregate, the maximum frequency mode Stokes diameter is represented by $D_{st}$ (nm), and the half band width of the $D_{st}$ is represented by $\Delta D_{50}$ (nm). The relationship between the aggregate size distribution, $\Delta D_{50}/D_{st}$, and the spraying nozzle site is shown in FIG. 8.

increasing the difference in the internal volume of the reactor between the first stage spraying nozzle and the second-stage spraying nozzle. Further, it is apparent that when the material hydrocarbon nozzle provided on the side of the reaction chamber is used as the second-stage spraying nozzle, the aggregate size distribution of the formed carbon black becomes broader than that of the case where the material hydrocarbon nozzle is provided at the venturi expanding portion.

TABLE 6

| | | | | | |
|---|---|---|---|---|---|
| Material hydrocarbon feed site | 18-1, 18-2 | 18-1, 18-3 | 18-1, 18-4 | 18-1, 18-5 | 18-1, 18-6 |
| Material hydrocarbon feed rate (l/hr) | 120–160 | 120–160 | 120–160 | 120–160 | 120–160 |
| Fuel feed rate (l/hr) | 53 | 53 | 53 | 53 | 53 |
| Total air feed rate ($Nm^3$/hr) | 1,000 | 1,000 | 1,000 | 1,000 | 1,000 |
| $D_{st}$ (nm) | 140 | 135 | 137 | 145 | 132 |
| $\Delta D_{50}$ (nm) | 112 | 112 | 123 | 174 | 158 |
| $\Delta D_{50}/D_{st}$ | 0.80 | 0.83 | 0.90 | 1.20 | 1.20 |

INDUSTRIAL APPLICABILITY

According to the present invention, the particle size distribution and the aggregate size distribution can be controlled as desired by, in spraying a carbon black material hydrocarbon, providing a throat for imparting a piston flow effect to the reactor and a venturi expanding portion, thereby bringing a combustion gas passing therethrough into a piston flow state; and at the same time, providing a plurality of spraying nozzles at at least two separate sites along the axial direction of the venturi expanding portion and using, selected from them, one spraying nozzle or two or more spraying nozzles provided in the axial direction to spray a material hydrocarbon from a singly selected nozzle or two or more nozzles in combination; or providing a plurality of spraying nozzles at two or more separate sites along the axial direction of the cylindrical throat, venturi expanding portion and reaction chamber and selecting from them at least two spraying nozzles provided in the axial direction and using them in combination; or adjusting the proportion of the material hydrocarbon introduced through each material hydrocarbon spraying nozzle. Therefore, the present invention can greatly contribute to control of the quality of a carbon black product in the carbon black production industry.

We claim:

1. In a process for preparing carbon black, in an apparatus having a substantially streamwise center line comprised of:

a combustion chamber, a cylindrical throat more contracted than said combustion chamber, and successively downstream from the throat, an expanding venturi portion, and a carbon black reaction chamber which is more expanded than said throat;

said process comprising:

substantially combusting a fuel in said combustion chamber into a hot combustion gas, having properties necessary to support carbon black formation including substantially no combustable components;

feeding a carbon black precursor hydrocarbon material, having a CF value of at least less than about 10.1 and a BMCI value of more than about 100, into said hot combustion gas downstream of said combustion chamber, under conditions sufficient to convert such to carbon black in said reaction chamber;

forming carbon black from said hydrocarbon material in said reaction chamber; and quenching the carbon black thus formed;

the improvement which comprises the combination of:

passing said hot combustion gas in a substantially one phase, plug laminar flow state, through at least said expanding venturi portion; and spraying said carbon black precursor hydrocarbon material into said laminar flowing hot combustion gas, under conditions sufficient to convert such to carbon black, from hydrocarbon material spraying nozzles provided at at least two locations which are axially spaced from each other and are each radially spaced a different distance from the center line of said expanding venturi portion, at least one of which is in said expanding portion, the downstream of at least one of said locations being spaced radially further from said center line than at least one of an upstream of said locations.

2. An improved process for preparing carbon black as claimed in claim 1 including spraying said hydrocarbon material into said laminar flowing combustion gas from said locations at least one of which is in said expanding venturi member, and at least one other of which is positioned in at least one of said cylindrical throat, said expanding venturi member, and said reaction chamber.

3. An improved process for preparing carbon black according to claim 2, which further comprises the combination of spraying said hydrocarbon material into said hot gas at two or more axially separate sites in said cylindrical throat, said expanding venturi member and said reaction chamber, and adjusting the proportions of the hydrocarbon material introduced respectively through each of said hydrocarbon material spraying sites.

4. An improved process for preparing a carbon black according to claim 2 or 3, wherein said hydrocarbon material is sprayed into said hot gas at a first-stage hydrocarbon material spraying nozzle provided in said cylindrical throat or said expanding venturi member, and a second-stage hydrocarbon material spraying, wherein said second stage spraying is downstream of said first-stage spraying.

5. An improved process for preparing carbon black according to any one of claims 1, 3, 4 or 2 wherein said expanding venturi portion has a divergent angle of 5° to 12°.

6. An improved process as claimed in claim 5 wherein said expanding venturi portion has a cylindrical throat which has a ratio of length, L, to diameter, D, i.e., L/D, of at least 1.

7. An improved process as claimed in claim 1 including spraying said hydrocarbon material simultaneously from at least two nozzles disposed at axially separated positions along said expanding venturi portion.

8. An improved process as claimed in claim 1 wherein the diameter of the upstream end of said expanding venturi is substantially equal to the diameter of said throat, and the diameter of the downstream end of said venturi is substantially equal to the diameter of said reaction chamber.

9. An improved process as claimed in claim 4 wherein hydrocarbon material is sprayed into said hot gas simultaneously from both said first and second stage nozzles.

10. An improved process for preparing a carbon black according to claim 3, wherein said hydrocarbon material is sprayed into said hot gas at either said hydrocarbon material spraying nozzle provided in said expanding venturi member, or a hydrocarbon material spraying nozzle provided in said reaction chamber downstream of said expanding venturi portion.

11. An improved process as claimed in claim 10 wherein hydrocarbon material is sprayed into said hot gas simultaneously from both of said nozzles.

* * * * *

UNITED STATES PATENT AND TRADEMARK OFFICE
CERTIFICATE OF CORRECTION

PATENT NO. : 5,254,325
DATED : October 19, 1993
INVENTOR(S) : Hiroshi YAMASAKI et al It is certified that error appears in the above-indentified patent and that said Letters Patent is hereby corrected as shown below:

On the title page, Item [30], second line, change "February 28, 1990" to -- February 28, 1989 --.

Signed and Sealed this

Seventh Day of June, 1994

Attest:

BRUCE LEHMAN

*Attesting Officer*     Commissioner of Patents and Trademarks